United States Patent [19]

Nakagawa

[11] Patent Number: 4,651,462

[45] Date of Patent: Mar. 24, 1987

[54] FASTENING TOOL OF THE FISHING LINE SINKERS

[76] Inventor: Katsutoshi Nakagawa, 517-18, Komoe, Nishiwaki-shi, Hyogo, Japan

[21] Appl. No.: 859,446

[22] Filed: May 5, 1986

Related U.S. Application Data

[63] Continuation of Ser. No. 652,756, Sep. 20, 1984, abandoned.

[51] Int. Cl.⁴ .............................................. A01K 97/00
[52] U.S. Cl. ........................................ 43/54.1; 7/106; 72/416
[58] Field of Search ............................. 43/54.1, 44.89; 29/283.5, 241; 7/106; 72/409, 416

[56] References Cited

U.S. PATENT DOCUMENTS

| | | | |
|---|---|---|---|
| 1,359,668 | 11/1920 | Buchenau | 43/54.1 |
| 1,374,807 | 4/1921 | Beaty | 7/106 |
| 2,051,136 | 8/1936 | Dormire | 43/54.1 |
| 2,765,576 | 10/1956 | Kurek | 43/54.1 |
| 2,814,904 | 12/1957 | Reedall | 43/54.1 |
| 3,003,376 | 10/1961 | Macy | 7/106 |
| 3,172,319 | 3/1965 | Stanfield | 7/106 |
| 4,238,901 | 12/1980 | Martinet | 43/54.1 |

Primary Examiner—Gene P. Crosby
Attorney, Agent, or Firm—Darby & Darby

[57] ABSTRACT

A tool for fastening the sinker to the fishing line with a pressing facility installed at its side wall portion of the container of sinkers for inserting the sinkers in the notches having been formed. In fastening the sinkers to the fishing line, those sinkers taken out of the container are placed in the notches and are fixed to the fishing line by fastening the pressing facility portion with hand by gripping it.

4 Claims, 4 Drawing Figures

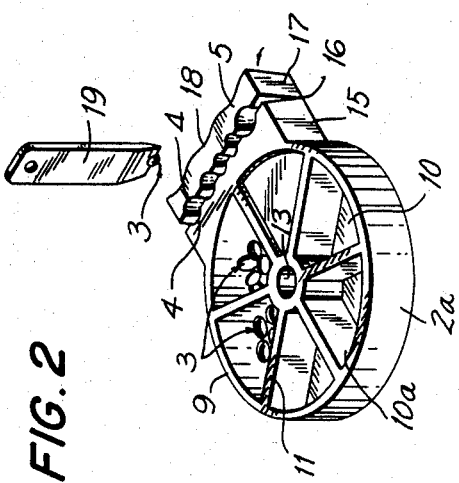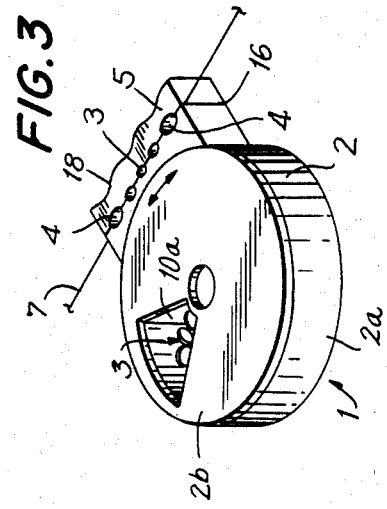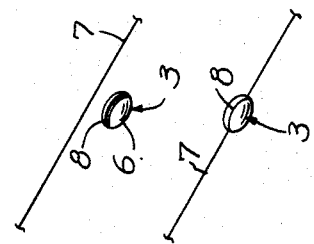

FASTENING TOOL OF THE FISHING LINE SINKERS

This is a continuation of application Ser. No. 652,756, filed Sept. 20, 1984, now abandoned.

BACKGROUND DESCRIPTION OF THE INVENTION

This invention relates to a fastening tool of the fishing line sinkers which can be used as one unit with the container of sinkers of the fishing line.

With regard to the sinkers of the fishing line conventionally used in angling in the river or in the mountain stream, an engraved gutter 8 is formed on the body of sinkers in a manner to accept the fishing line 7 at the center of their body, as shown in FIG. 1, and fastening them to the fishing line 7 can be done by getting the fishing line through them and then by pressing the side of the sinkers to deform the the engraved gutters 8.

As the method to press the sinkers in using this kind of sinkers, pinchers are usually used or in other case the sinkers are held between the teeth and pressed by biting. Even in such method, there is no problem when the sinkers are rather big. In case when they are very small, however, it is difficult to put them in place between the pinchers because they are not properly held with fingers easily. Especially in the cold weather of winter when the tips of the fingers are numb, fastening the sinkers is often a painful job. While the job of knotting the trunk fishing line with a branch fishing line or tying a fishing hook with a fishing line can be done without much difficulty as one's skill is improved. But fastening such a small sinkers to the fishing line is very difficult even to a skilled hand.

SUMMARY OF THE INVENTION

The present invention intends to make the fastening of a sinker to the fishing line easy and convenient by forming the press-fastening facility with various engraved notches corresponding to the shapes of the sinkers at an appropriate portion of the container of the sinkers.

BRIEF DESCRIPTION OF THE DRAWINGS

The appended drawings show an example of embodiment of the present invention.

FIG. 1 is a perspective view showing the fastening of a sinker to a fishing line.

FIG. 2 is a perspective view showing the arrangement of the press-fastening facility for sinkers from the container of the device.

FIG. 3 is a perspective view showing the state of its use.

DETAILED DESCRIPTION OF THE INVENTION

Figure 4:
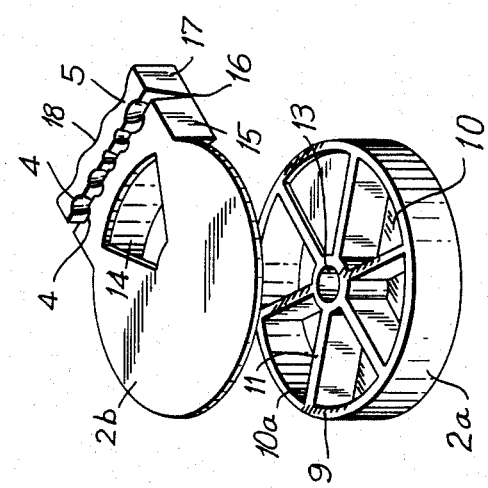
FIG. 4 is a perspective view of another embodiment of the present invention.

As shown in FIGS. 2 and 3, the container 2 of the fishing line sinkers is composed of a round tray 2a and a cover unit 2b which is mounted on the tray 2a in a freely turnable manner. Said tray 2a is of a structure having a round wall part 9 and cavities 10 for containing the sinkers, and the cavities 10 are a plurality of containing spaces 10a divided by the partitioning walls 11 for each different kind of sinkers to be contained separately, with a hole 13 in its center part for accepting the cover unit 2 to be fit in a freely turnable manner.

As shown in FIG. 3, the cover unit 2b is formed of a transparent round plate in the same overall size and shape as the tray 2a. And at a certain portion of the cover unit 2b, an opening 14 is provided in a corresponding form to each separated sinker containing spaces 10a, with a cylindrical projection (not illustrated) being extended downward from the center part of the cover unit 2b. For fitting the cover unit 2b to the tray 2a, therefore, it is done by inserting said formed cylindrical projection part of the cover unit 2b into the hole formed on the tray 2a, and then expanding the lower end part of the cylindrical projection.

The press-fastening facility part 5 is formed in one unit at one side of the tray 2a as an additional part. In other words, the press-fastening facility part 5 is formed at one extended end of the tray 2a of the sinker container 2 and the arrangements of the blocks 15 and 17 are made at one upper end part of the container 2, the former having a plurality of engraved notches a little shallower than one half sizes of each kind of sinkers 3 and the latter being fixed via the hinge 16 forming a plurality of engraved notches corresponding in shapes to the counterparts on the block 16. By applying fingers to the dented parts 18 at the end of the block 17 and pulling the block to this side, the sinkers inserted into the gutter are pressed and deformed, as shown in FIG. 3.

The above-described is the case wherein the press-fastening facility part 5 is arranged to the side of the tray 2a. As another example of embodiment, however, it is possible to arrange said press-fastening facility part 5 on the side brim of the cover unit 2b as shown in FIG. 4. In such case it is preferred to have a structure wherein said press-fastening facility part 5 is arranged nearby the opening 14 of the cover unit 2b.

The configuration of the fastening tool 1 of the fishing line sinkers in accordance with the present invention is as it is described in the above. In using it, the sinkers are taken out by inserting the tapered sharp edge of the plate piece 19 shown in FIG. 2 into the engraved gutter part of the sinkers and carry them into the engraved notches 4 formed on the press-fastening facility part 5. In this case the sinkers are placed in a state of their engraved gutters facing upward. It is easy therefore in such state of sinkers to insert the trunk fishing line into their gutters. The pressfastening facility part 5 can pulled to this side with the fingers applied and gripped. By this the fastening tool of the fishing line sinkers is put into the state as shown in FIG. 3, finishing the job of fastening the sinkers to the finishing line by taking out the fishing line out of fastening tool 1. Although the plate piece 19 shown in FIG. 2 is not made a comprising factor of this invention, it is convenient for taking out the sinkers with this plate. It is possible to tie this plate piece 19 with a string to the main body of the tool, making it a part of the entire configuration.

The fastening tool of the sinkers in accordance with the present invention has the configuration as described in the above, making it possible to have the the merit of smoothly fastening the sinkers to the fishing line which is a troublesome job even to a skilled hand.

Furthermore, the containing part of sinkers being near in position to fastening facility, it can help avoid dropping and losing the sinkers. In case when the configuration is as shown in FIG. 4, the opening 14 for taking out the sinkers being near at hand from the press-fastening facility part 5, it is very handy to use the tool.

What is claimed is:

1. The combination comprising
    a container having at least one compartment for holding sinkers for fishing lines,
    means for attachment to said container for covering said compartment,
    sinker pressing means attached to one of said container or cover means, said pressing means comprising first and second jaw blocks having a connecting hinge extending along the edge of each jaw block, each of said jaw blocks having a plurality of recesses therein which oppose each other so that a pair of opposing recesses define a pocket for holding a sinker, said sinker being deformed as force is applied to one of said hinged jaw blocks to move it toward the other jaw blocks.

2. The combination of claim 1 wherein the outermost face of said jaws has a plurality of depressions to accommodate the finger of a user.

3. The combination of claim 1 wherein said pressing means is attached to said container.

4. The combination of claim 1 wherein said pressing means is attached to the cover means.

* * * * *